US006737904B1

United States Patent
Butaud et al.

(10) Patent No.: US 6,737,904 B1
(45) Date of Patent: May 18, 2004

(54) CLOCK CIRCUIT, GSM PHONE, AND METHODS OF REDUCING ELECTROMAGNETIC INTERFERENCE

(75) Inventors: Remi Butaud, Valbonne (FR); Bernard Ginetti, Antibes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/439,970

(22) Filed: Nov. 12, 1999

(51) Int. Cl.[7] .............................. H03K 3/00; G06F 1/04
(52) U.S. Cl. .......................... 327/298; 327/99; 331/78; 331/178
(58) Field of Search ........................ 327/99, 298, 291, 327/293, 294, 299; 331/78, 178

(56) References Cited

U.S. PATENT DOCUMENTS

| | | | |
|---|---|---|---|
| 5,142,247 A | * 8/1992 | Lada et al. ................. 331/14 |
| 5,263,055 A | * 11/1993 | Cahill ........................ 375/346 |
| 5,430,392 A | 7/1995 | Matejic ..................... 327/113 |
| 5,488,627 A | 1/1996 | Hardin et al. ............. 375/139 |
| 5,669,005 A | 9/1997 | Curbow et al. ........... 395/777 |
| 5,731,728 A | * 3/1998 | Greiss ........................ 327/299 |
| 5,745,848 A | 4/1998 | Robin ........................ 455/296 |
| 5,787,076 A | 7/1998 | Anderson et al. ......... 370/294 |
| 5,811,995 A | * 9/1998 | Roy et al. .................... 327/99 |
| 5,812,590 A | 9/1998 | Black et al. ............... 375/130 |
| 5,818,820 A | 10/1998 | Anderson et al. ......... 370/280 |
| 5,826,181 A | 10/1998 | Reed ......................... 455/312 |
| 5,842,037 A | 11/1998 | Haartsen .................... 710/1 |
| 5,872,801 A | 2/1999 | Mobin ....................... 375/94 |
| 5,923,761 A | 7/1999 | Lodenius .................. 455/73 |
| 6,014,063 A | * 1/2000 | Liu et al. ................... 331/78 |
| 6,181,213 B1 | * 1/2001 | Chang ....................... 331/34 |
| 6,282,184 B1 | * 8/2001 | Lehman et al. ........... 370/342 |
| 6,348,744 B1 | * 2/2002 | Levesque .................. 307/86 |
| 6,377,792 B1 | * 4/2002 | Brown et al. ............. 455/411 |
| 6,377,810 B1 | * 4/2002 | Geiger et al. ............. 455/456.2 |

* cited by examiner

*Primary Examiner*—Tuan T. Lam
(74) *Attorney, Agent, or Firm*—Aaron Waxler (57) ABSTRACT

A method of producing a clock signal with reduced electromagnetic interference spectral components includes providing a first clock signal; producing a second clock signal by delaying the first clock signal; and generating a jittered clock signal by switching between the first clock signal and the second clock signal at times selected responsive to a random number generator. A GSM phone comprises a clock configured to produce a first clock signal; a delay element coupled to the clock to produce a second clock signal by delaying the first clock signal; a multiplexer coupled to the clock and to the delay element to select between the clock and the delay element; a random number generator coupled to the multiplexer wherein the multiplexer generates a jittered clock signal by switching between the first clock signal and the second clock signal responsive to the random number generator; and a plurality of GSM phone components respectively coupled to the multiplexer to use the jittered clock signal as an input clock for the component.

24 Claims, 8 Drawing Sheets

CLOCK CIRCUIT, GSM PHONE, AND METHODS OF REDUCING ELECTROMAGNETIC INTERFERENCE

TECHNICAL FIELD

This invention relates to methods of and apparatus for reducing of electromagnetic interference emitted by a circuit. More particularly, the invention relates to methods of and apparatus for reducing electromagnetic interference emitted by a clock circuit.

BACKGROUND OF THE INVENTION

Many devices have logic integrated circuits that use a high frequency clock which, in combination with high frequency harmonics, can create electromagnetic interference in other integrated circuits. The clock can also create electromagnetic interference with radio circuits through an antenna, or other circuits which are not necessarily integrated circuits. This clock is shared with other system elements including circuits outside of the integrated circuit that has the clock. An integrated circuit with logic working at such a frequency will create, on its power supply pins and output signals, a lot of high frequency harmonics of the base clock frequency. These harmonics will spread beyond the integrated circuit that has the clock through wires on a PCB (printed circuit board) on which the integrated circuit having the clock is mounted. Electromagnetic interferences are interferences caused by another source.

Numerous wireless communication standards have been introduced in recent years to accommodate a number of diverse communication applications. Exemplary conventional communication standards include Personal Handy-Phone Systems (PHS) and Digital European Cordless Telephone (DECT) and Global Systems for Mobile Communications (GSM). Such communication protocols provide communication channel slots structured in frames individually containing multiple slots. Data packets are allocated to communication slots in such communication systems. The frame structures are repeated in time and each time the appropriate slot number occurs, the data packet associated with the slot is either transmitted or received.

In a system such as a GSM cellular phone, there is a baseband chip (where base frequency data processing occurs) that has a reference clock. The reference clock is a main clock used on the board, and used to synchronize different elements of the system, but the GSM chip itself (or system) can use other clocks. For the example of a GSM cellular phone, the clock frequency of the reference clock is 13 MHz. In the example of a GSM cellular phone, some of the high order harmonics of the base clock frequency are coincident with some radio channels, and the high frequency noise emitted by the baseband chip running at 13 MHz can be directly picked up by the antenna of the GSM cellular phone from the PCB wires.

More particularly, in a GSM phone, the baseband GSM integrated circuit produces high frequency harmonics on its power supply pins, which create electrical and magnetic fields around the board wires and the integrated circuit. These fields can be picked up by a radio antenna of the GSM phone, as described above, and added to the radio signal as a noise source. These noise sources, if they have peaks located inside GSM phone radio channels, or coincident with radio channels, can in turn be mistaken for actual radio signals.

One solution is to shield the different components on the PCB, plus the PCB wires, but this can be very costly. Less expensive solutions can be developed if emissions of high frequency noise can be reduced.

Attention is directed to the following patents, all of which are incorporated herein by reference: U.S. Pat. No. 5,731,728 issued to Greiss; U.S. Pat. No. 5,488,627 issued to Hardin et al.; U.S. Pat. No. 5,430,392 issued to Matejic; and U.S. Pat. No. 5,263,055 to Cahill. The solutions described in these patents, and other prior art solutions are typically complicated and expensive, often using circuitry such as a radio stage or an oscillator.

GSM is a form of time division multiple access (TDMA) communications. The term GSM, as used herein and in the appended claims, is to be construed as encompassing the PCS standard used in the United States and elsewhere. GSM systems are described in greater detail in the following patents, all of which are incorporated herein by reference: U.S. Pat. No. 5,923,761 to Lodenius; U.S. Pat. No. 5,872,801 to Mobin; U.S. Pat. No. 5,842,037 to Haartsen; U.S. Pat. No. 5,826,181 to Reed; U.S. Pat. No. 5,818,820 to Anderson et al.; U.S. Pat. No. 5,812,590 to Black et al.; and U.S. Pat. No. 5,787,076 to Anderson et al.

SUMMARY OF THE INVENTION

This invention provides a simple way to spread the spectrum of the basic clock on a chip, so that its high-frequency components will be flattened. The spectral energy being the same, there will be less frequency peaks that, for example, could fall into a radio channel if the clock is used in a GSM phone. The idea of spreading the spectrum is itself well known, but the way by which it is achieved in accordance with the invention is very simple and economic both in terms of area and power. The invention can, of course, be applied to all the clocks that are distributed in an integrated circuit.

The invention provides a method of producing a clock signal with reduced electromagnetic interference spectral components, the method comprising providing a first clock signal; producing a second clock signal by delaying the first clock signal; and generating a jittered clock signal by switching between the first clock signal and the second clock signal at times selected responsive to a random number generator.

One aspect of the invention provides a method of producing a clock signal that generates reduced electromagnetic interference, the method comprising providing a first clock signal; producing a second clock signal by delaying the first clock signal; and generating a jittered clock signal using a multiplexer to pseudo-randomly switch between the first clock signal and the second clock signal over time. In one aspect of the invention, the multiplexer has multiple additional inputs, and the method further comprises producing multiple additional clock signals, different from the first and second clock signals, and coupling the multiple additional clock signals to respective additional inputs of the multiplexer, and wherein generating a jittered clock signal comprises generating a jittered clock signal by causing the multiplexer to switch between the first clock signal, the second clock signal, and the additional clock signals, to select any one of the time signals, at times selected responsive to a pseudo-random number generator.

Another aspect of the invention provides a method of reducing electromagnetic interference in a GSM phone having a plurality of components that use a clock signal, the method comprising providing a first clock signal; producing a second clock signal by delaying the first clock signal; generating a jittered clock signal by switching between the first clock signal and the second clock signal at times determined responsive to a random number generator; and using the jittered clock signal as a system clock for at least some components of the GSM phone.

Another aspect of the invention provides circuitry for producing a clock signal with reduced electromagnetic interference spectral components, comprising a clock configured to produce a first clock signal; a delay element coupled to the clock to produce a second clock signal by delaying the first clock signal; a multiplexer coupled to the clock and to the delay element to select between the clock and the delay element, the multiplexer having a select input which determines whether the clock or delay element is selected; and a random number generator coupled to the select input, wherein the multiplexer generates a jittered clock signal by switching between the first clock signal and the second clock signal responsive to the random number generator.

Another aspect of the invention provides a GSM phone comprising a clock configured to produce a first clock signal; a delay element coupled to the clock to produce a second clock signal by delaying the first clock signal; a multiplexer coupled to the clock and to the delay element to select between the clock and the delay element; a random number generator coupled to the multiplexer wherein the multiplexer generates a jittered clock signal by switching between the first clock signal and the second clock signal responsive to the random number generator; and a plurality of GSM phone components respectively coupled to the multiplexer to use the jittered clock signal as an input clock for the component.

In one aspect of the invention, the original clock signal is replaced with a jittered clock signal, this jittered clock signal being generated by a multiplexer pseudo-randomly choosing between the original clock or a delayed clock. In simulation, this has shown an improvement of 10 dBm for the simplest implementation on the high-frequency components of the master clock.

The simplest embodiment of the invention requires only one multiplexer, 5 D-type flip-flops, and a few logic gates. This is very simple in comparison with other known methods, such as those shown in U.S. Pat. No. 5,731,728 to Greiss; U.S. Pat. No. 5,263,055 to Cahill; U.S. Pat. No. 5,430,392 to Matejic;, or U.S. Pat. No. 5,488,627 to Hardin et al, all of which are incorporated herein by reference.

BRIEF DESCRIPTION OF THE DRAWINGS

Preferred embodiments of the invention are described below with reference to the following accompanying drawings.

If FIG. 6 is a graph of voltage magnitude versus frequency, which illustrates the reduction of electromagnetic interference resulting from using a clock jitter circuit in accordance with one aspect of the invention, on a core power node.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention provides a method and apparatus for switching to use either the system clock, or a slightly delayed system clock for the circuit's main clock. The delay must not be big as the concern is primarily with the very high frequency (and so, high order) harmonics of the system clock. As an example, a 350 ps delay on a 13 MHz clock brought down the harmonics by 10 dBm. This allows the noise emitted through the power supplies to the board wires to have a "smoother" spectrum in these high frequencies, hence reducing the frequency peaks that could appear inside the radio channels, for example.

Figure 1:
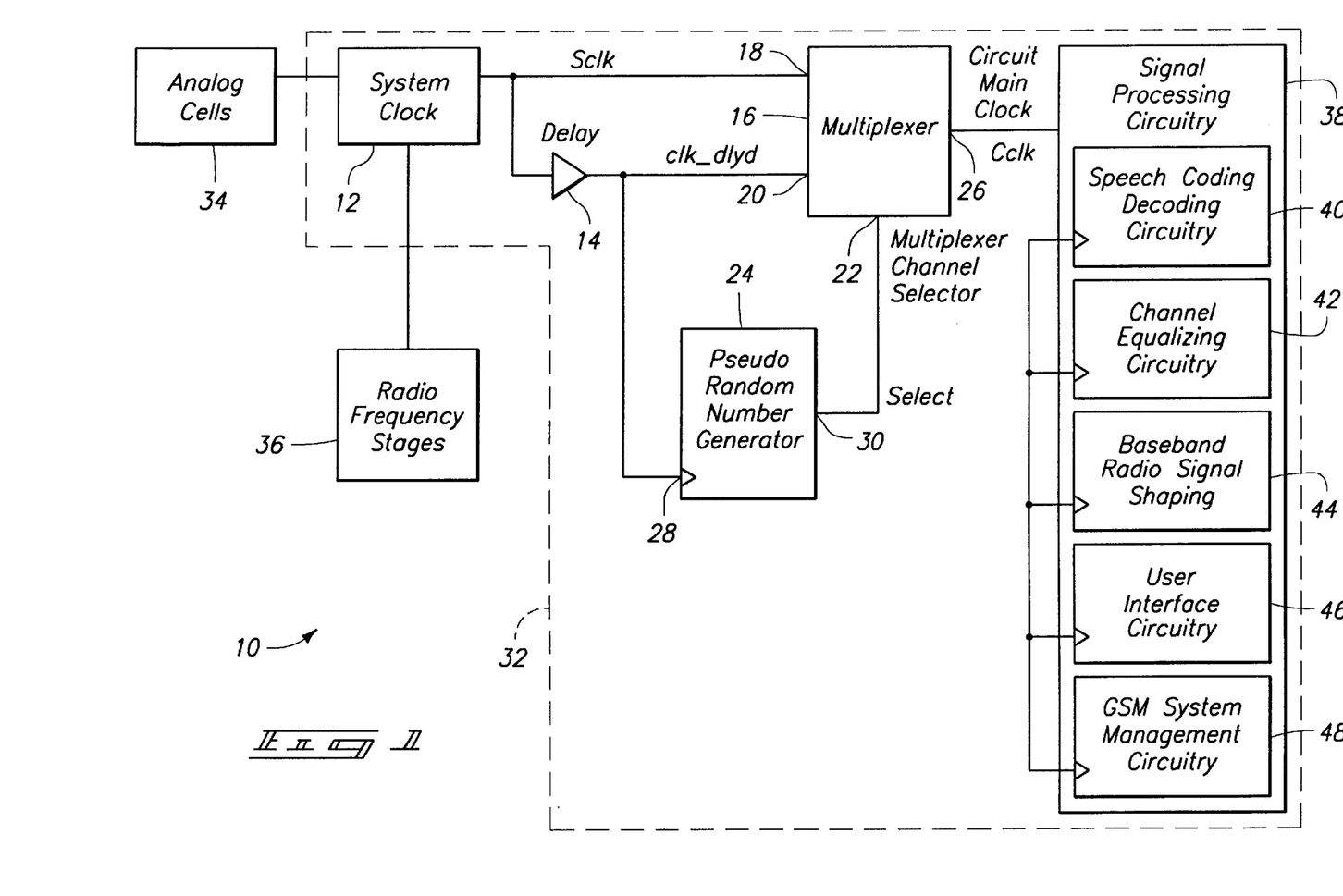
FIG. 1 is a circuit schematic of a GSM phone including a clock jitter circuit embodying the invention.

FIG. 1 shows a GSM phone 10 in accordance with one embodiment of the invention. The GSM phone embodiment is provided by way of example only. In the case of a GSM phone, the clock signal is, in one embodiment (e.g., in Europe and some other places), at 13 MHz and the interferences to reduce are in the 900 MHz range (e.g. 936 and 949 MHz). The term "GSM," as used herein and the appended claims, is intended to encompass the 900 MHz range used in Europe (and other places); the 1800 MHz range used in Europe (and other places); and the 1900 MHz range (PCS 1900) used in the U.S. and other places. The invention has application in embodiments other than phones. Any application that uses a clock signal and in which it is desired to reduce EMI emissions in frequencies much higher than the clock frequency can benefit from the invention.

The GSM phone 10 includes a clock 12 configured to produce a first clock signal "Sclk." The clock 12 can be, for example, a clock similar or identical to one that would conventionally be used as a system clock in a GSM phone. The GSM phone 10 further includes a delay element 14 coupled to the clock 12 to produce a second clock signal "clk_dlyd" by delaying the first clock signal "Sclk."

The GSM phone 10 further includes a multiplexer 16 having inputs 18 and 20 respectively coupled to the output "Sclk" of the clock 12 and to the output "clk_dlyd" of the delay element 14 to select between the clock 12 and the delay element 14. The multiplexer 16 further has a select input 22 which determines whether the first clock signal "Sclk" or the second clock signal "clk_dlyd" is selected.

The GSM phone 10 further includes a random number generator (pseudo-random number generator) 24 having an output 30 ("Select") coupled to the select input 22. The multiplexer 16 has an output 26 and generates at the output 26 a jittered clock signal by switching between the first clock signal "Sclk" and the second clock signal "clk_dlyd" responsive to the random number generator 24.

The pseudo-random number generator 24 has a clock input 28 and, in the illustrated embodiment, is clocked by the delayed clock "clk_dlyd" in order to avoid glitches. The pseudo-random number generator 24 provides at its output 30 a pseudo-random selection of "1" or "0" for each clock cycle, and the value at the output 30 will select one of the two input channels 18 or 20 ("Sclk" or "clk_dlyd") of the multiplexer to be present at the output 26 ("Cclk") of the multiplexer which is used as the baseband circuit main clock. This clock will hence have a pseudo-random jitter whose characteristics depend on the pseudo-random generator used.

The GSM phone 10 further includes conventional GSM phone components such as analog cells 34, and radio frequency (RF) stages 36 which use the system clock 12. The GSM phone 10 further includes baseband circuitry comprising signal processing circuitry 38. The signal processing circuitry 38 includes speech coding/decoding circuitry 40, channel equalizing circuitry 42, baseband radio signal shaping circuitry 44, user interface circuitry 46, and GSM system management circuitry 48 (e.g., for determining when to switch on the radio, when to emit, when to receive, how to communicate with the network, etc.). The signal processing circuitry 38 uses the jittered clock signal "Cclk," which is the low frequency clock (e.g., "Cclk" is 13 MHz in the 900 MHz embodiment).

Thus, the GSM phone 10 includes two frequency domain parts, the RF part, which operates at frequencies dependent on the appropriate GSM standard (e.g. 900, 1800 or 1900 MHz), and the baseband part, the signal processing circuitry, which operates at a lower frequency. It is to be noted that this "jittered" clock "Cclk" is to be used with the distributed clock inside the integrated circuit 32, but for accuracy reasons, it should not be used to control the RF stages 36, the analog cells 34, or any kind of synchronized communication with the "external world" (other parts of the system on the same printed circuit board). For these circuits, the clock 12 can still be used.

A simple simulation was run using such a clock circuit. Analyzing the spectrum of the currents in the board wires of a circuit board bearing an integrated circuit chip 32 having such a clock circuit has shown an improvement (peak reduction) of around 10 dBm. The delay induced by the delay chain 14 at the secondary input 20 was of the order of 350 ps on a 13 MHz clock 12, in one embodiment, or less than 0.5% of the main clock period. This jitter is used on all the distributed clocks inside an integrated circuit 32 that contains the circuitry 12, 14, 16, 24 and other baseband circuitry of the phone 10. The operations in the baseband digital circuitry are based on the circuit main clock "Cclk." In the simulation, the circuit main clock "Cclk" was running at 13 MHz, (the half clock period is 38.46 ns). Adding the 350 ps (0.35 ns) delay would not cause trouble unless the critical paths inside the circuit could not tolerate this extra time. This would only be true if a digital circuit designed to run at 13 MHz could not run at 12.94 MHz or 13.06 MHz. This would be a very badly designed chip, which would be unable to be manufactured in volume, as such uncertainties are well below the ones that volume production induce. All properly designed circuits allow such a margin.

In case of an internal clock of a higher frequency used inside the same integrated circuit 32 (like after being multiplied by means of a PLL, or by any other means), another "jitter" circuit 14, 16, 24 can be included, with a lower delay, and used on the higher frequency clock. This is to ensure that the introduced jitter has not been filtered by the multiplying circuit. Also, it would be wise not to feed such a multiplying circuit with a jittered clock, but rather with the original "clean" system clock 12 (as for analog cells, RF interface and other synchronized interfaces).

The kind of jitter of the clock signal "Cclk" is perfectly acceptable inside an integrated circuit and provides an EMI reduction for a very low cost.

Figure 3:
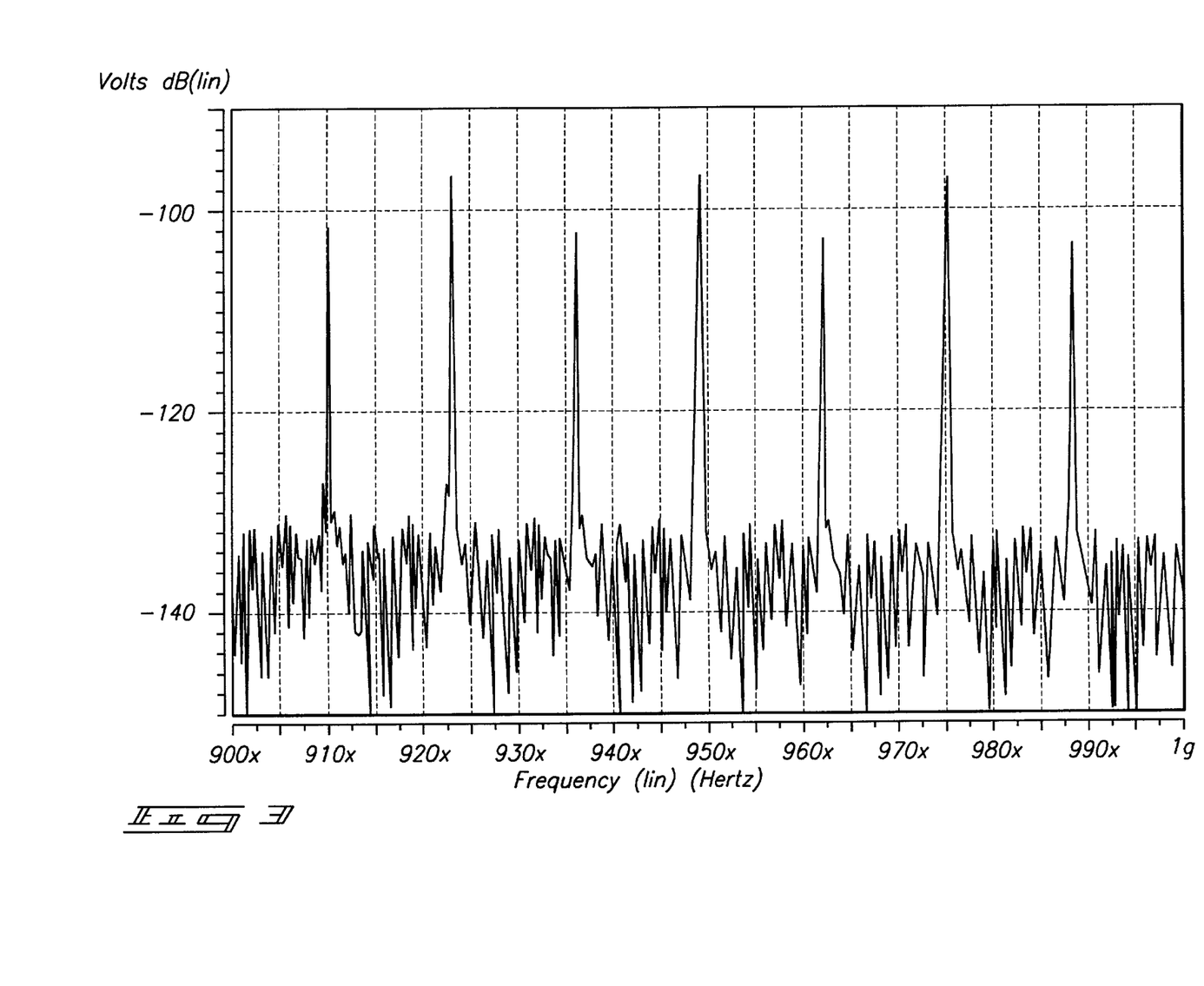
FIG. 3 is a graph of voltage magnitude versus frequency, which illustrates electromagnetic interference caused by a prior art clock, on a substrate node/core ground node.
Figure 4:
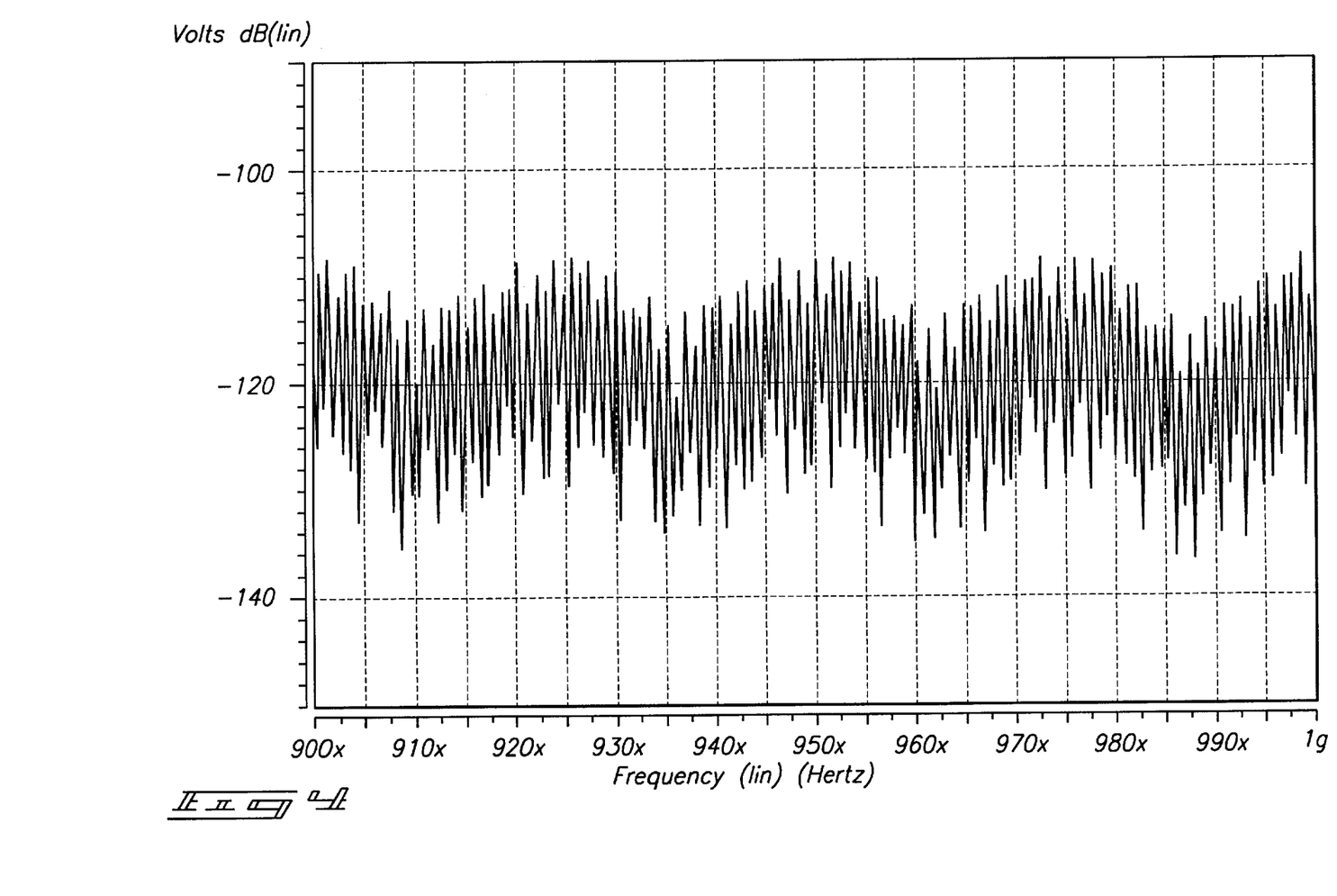
FIG. 4 is a graph of voltage magnitude versus frequency, which illustrates the reduction of electromagnetic interference resulting from using a clock jitter circuit in accordance with one aspect of the invention, on a substrate node/core ground node.

The results that were obtained with this simulation are summarized in FIG. 3, and FIG. 4. FIG. 3 shows the spectrum from 900 MHz to 1 GHz for the simulation for a 13 MHz clock, with the jitter circuit 14, 16, 24 bypassed, on the substrate node/core ground node of the integrated circuit. FIG. 4 shows the same spectrum, 900 MHz to 1 GHz, with the jitter circuit 14, 16, 24 being used, on the substrate node/core ground node of the integrated circuit. These are simulation results of an FFT on the current in the supply wires of the chip. The simulation did include the jitter circuit, a buffer at the output, and an I/O to the external world. What is interesting about FIG. 4 is the completely different shape of the spectrum, with no more peaks at 13 MHz harmonics. The overall noise level is raised, but the graph does not have the peaks of FIG. 3.

Figure 5:
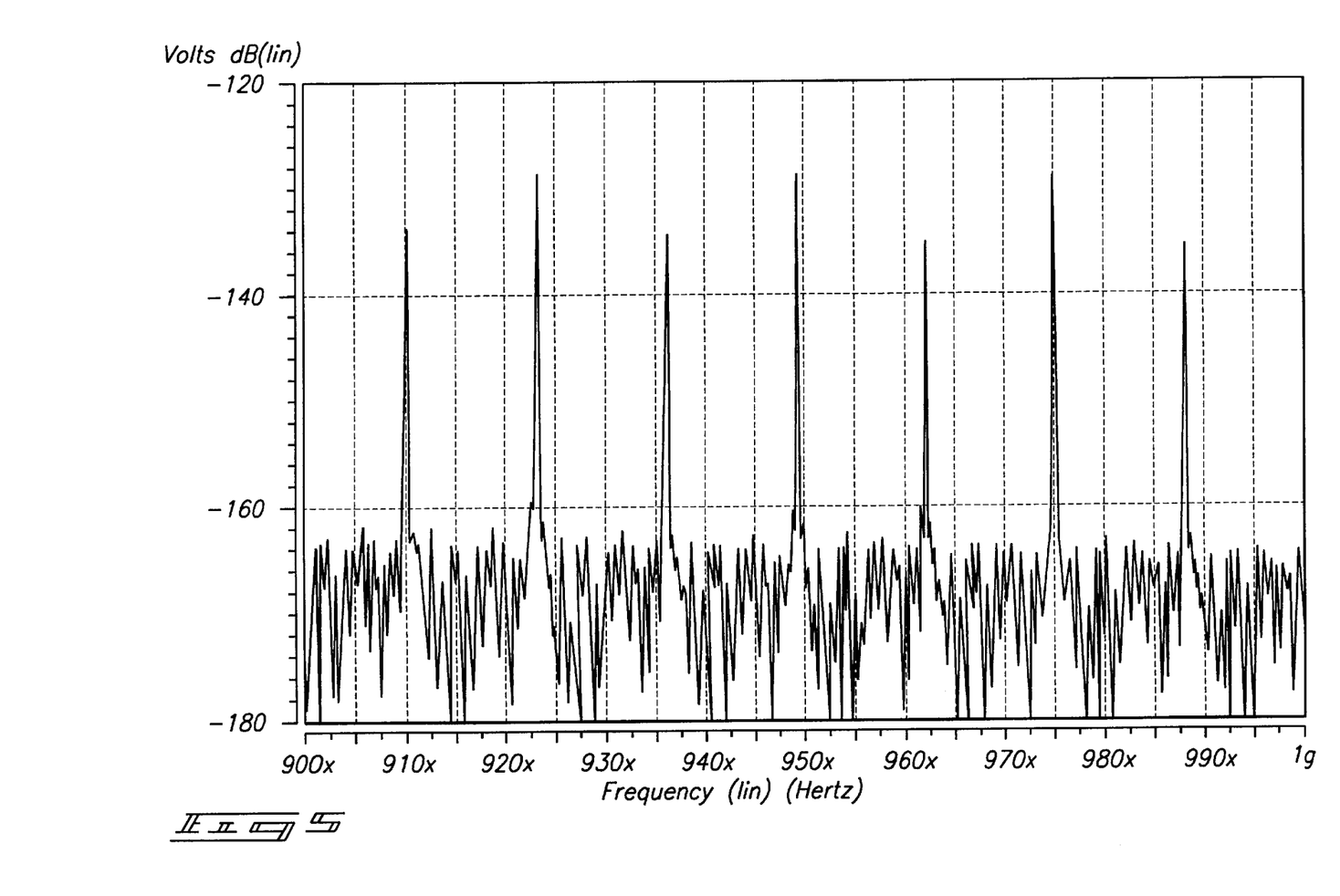
FIG. 5 is a graph of voltage magnitude versus frequency, which illustrates electromagnetic interference caused by a prior art clock, on a core power node.

FIG. 5 shows the spectrum from 900 MHz to 1 GHz for the simulation for a 13 MHz clock, with the jitter circuit 14, 16, 24 bypassed, on the core power node of the integrated circuit. FIG. 6 shows the same spectrum, 900 MHz to 1 GHz, with the jitter circuit 14, 16, 24 being used, on the core power node of the integrated circuit.

The difference between the ground node and power node is explained by the fact that the ground node is also the substrate of the chip. In both cases (FIGS. 3 and 4, and FIGS. 5 and 6), the result of the simulation is the same.

Figure 2:
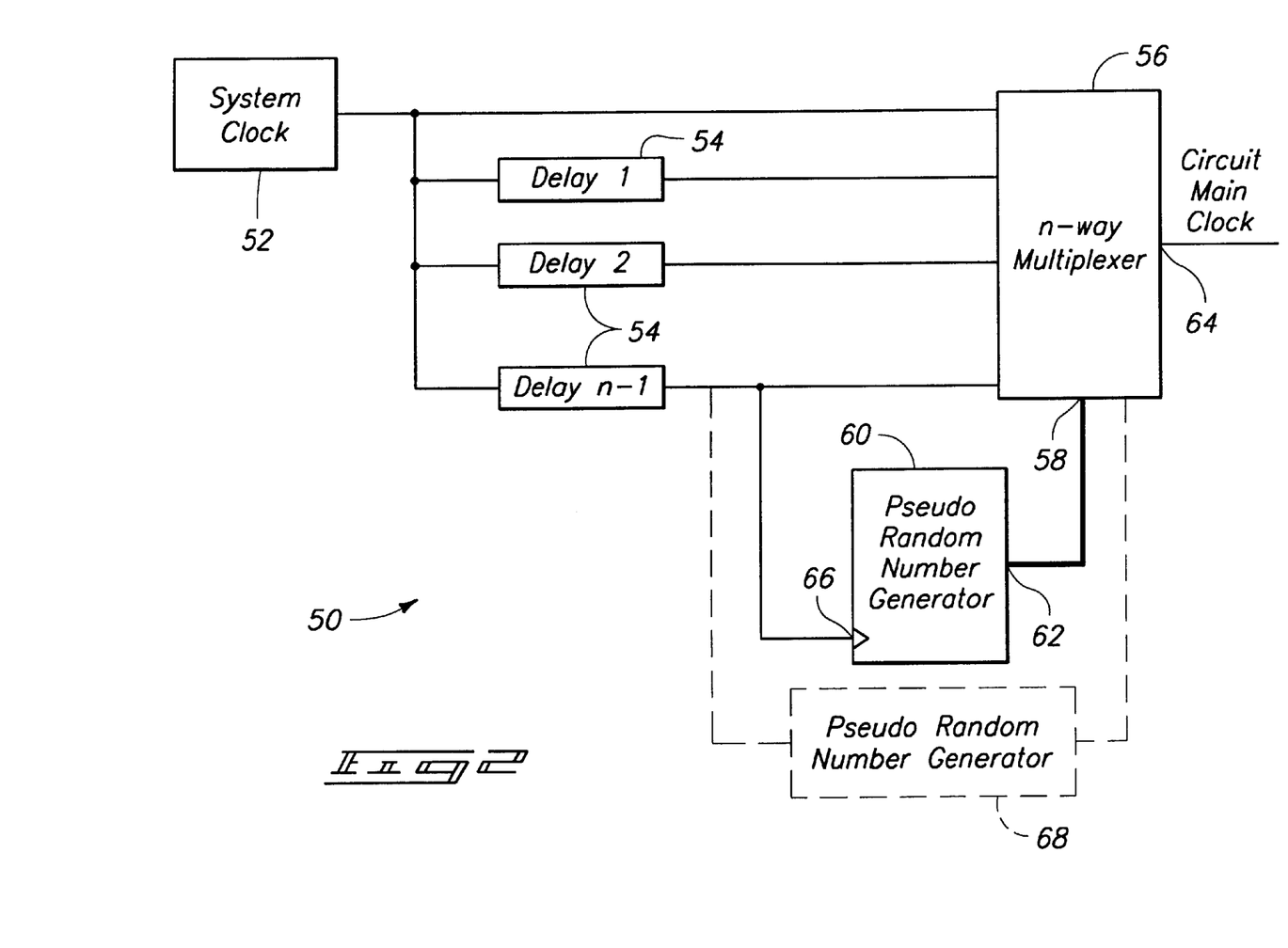
FIG. 2 is a circuit schematic of a clock jitter circuit in accordance with an alternative embodiment of the invention.

A more general description of a possible implementation can be found in FIG. 2, which is not necessarily a GSM phone embodiment. The embodiment of FIG. 2 employs an n-way multiplexer with n different delays with a pseudo-random selection of which way is active. This could help to smoothen even more the high-frequency spectrum.

More particularly, the embodiment of FIG. 2 illustrates a circuit 50, which is preferably an integrated circuit, and which includes a system clock 52. The clock 52 is a conventional, i.e. non-jittered, clock. The circuit 50 further includes any number "n" of delay elements 54 coupled to the clock 52. The delay elements 54 produce delays of different lengths and, respectively produce clock signals by delaying the clock signal produced by the system clock 52.

The circuit 50 further includes an n-way multiplexer 56 having "n" inputs respectively coupled to the outputs of the multiple delay elements 54. The multiplexer 56 further has a select input 58 which determines which of the delay elements 54 is selected.

The circuit 50 further includes a pseudo-random number generator 60 having an output 62 coupled to the select input 58. The multiplexer 56 has an output 64 and generates at the output 64 a jittered clock signal by switching between the "n" clock signals produced by the "n" delay elements 54 responsive to the pseudo-random number generator 60. The pseudo-random number generator 60 has a clock input 66 and, in the illustrated embodiment, is clocked by one of the delayed clocks produced by a delay element 54 in order to avoid glitches. The pseudo-random number generator 60 provides at its output 62, for each clock cycle, a pseudo-random number. The pseudo-random number generator 60 is selected such that its output has at least as many binary bits as are necessary based on the number of delay elements 54. Thus, for example, if there are four delay elements 54, at least two binary bits are required to select from four delay elements 54 (e.g., 00, 01, 10, 11). The pseudo-random number will select the output of one of the delay elements 54 provided to the multiplexer 56 to be present at the output 64 of the multiplexer. The output 64 of the multiplexer 56 is used as the main clock for appropriate (e.g., baseband) components of the circuit 50. This main clock will have a pseudo-random jitter with characteristics that depend on the pseudo-random generator used.

In one alternative embodiment of the invention, different random number generators control different selection signals (bits) to the same multiplexer. More particularly, if the multiplexer has four inputs, for example, two bits are required for the selection of the input (e.g. 00=input 1, 01=input 2, 10=input 3, 11=input 4), and each of these bits is controlled by a different pseudo-random sequence, in accordance with this embodiment. The two pseudo-random sequences have different repetition lengths (the number of time occurrences needed to cycle through the pseudo-random sequence). By having two numbers as the sequence lengths, one can then have an overall pseudo-random sequence length that is equal to the product of the two sequences lengths. This has the advantage of having a long sequence with a low silicon area requirement. This can be extended to any number of select signals and any number of pseudo-random number generators. In this alternative embodiment, one or more additional pseudo-random number generators 68 are provided.

Figure 7:
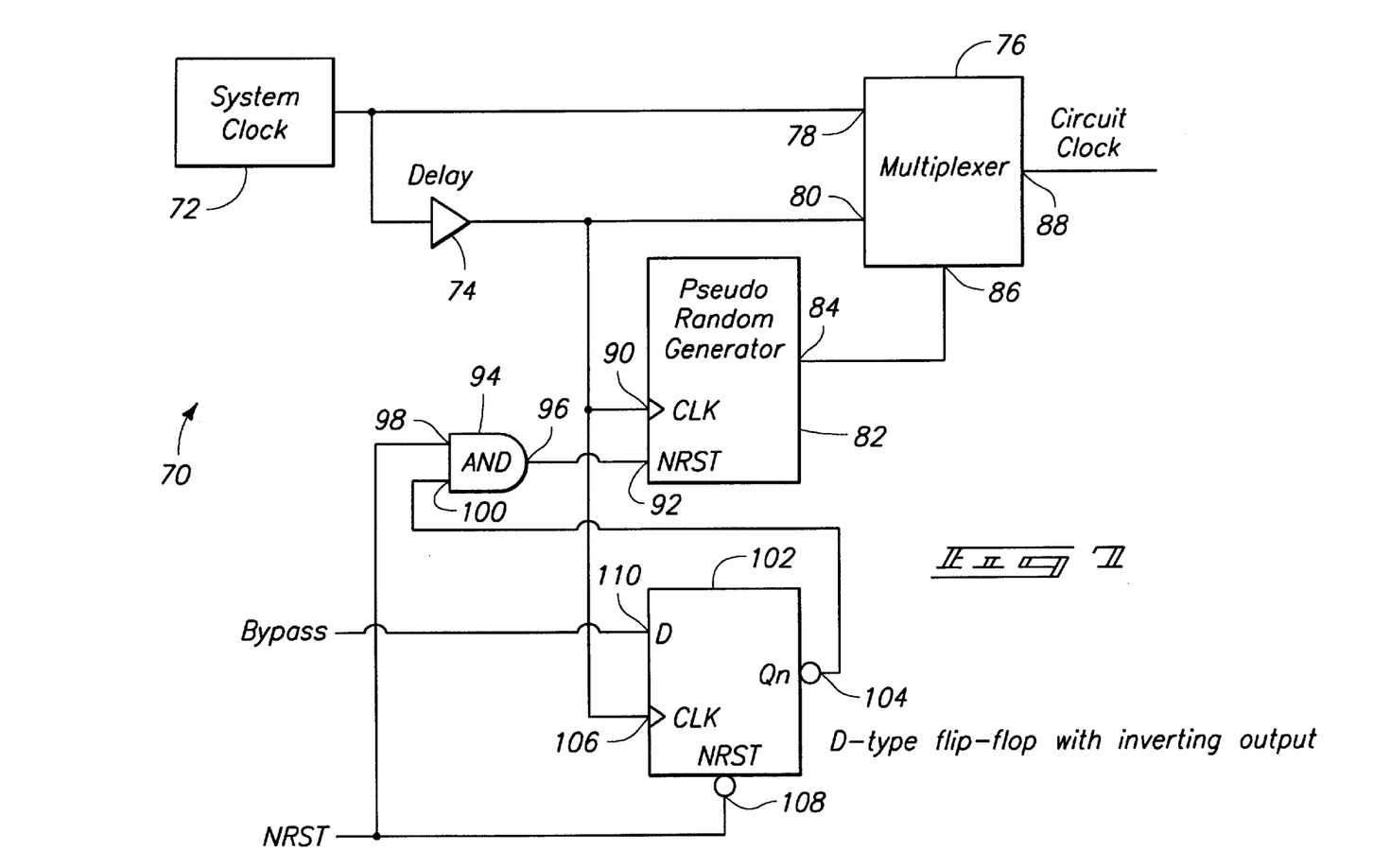
FIG. 7 is a circuit schematic of a clock jitter circuit in accordance with another alternative embodiment of the invention.

FIG. 7 shows another alternative embodiment which provides a bypass function that allows the user to select or not select the jittered clock as the main clock.

More particularly, FIG. 7 shows a circuit 70 that includes a clock 72. The clock 72 can be, for example, a clock similar or identical to one that would conventionally be used as a system clock in a circuit of the type contemplated. The circuit 70 further includes a delay element 74 coupled to the clock 72 to produce a second clock signal by delaying the first clock signal of the clock 72.

The circuit 70 further includes a multiplexer 76 having inputs 78 and 80 respectively coupled to the output of the clock 72 and to the output of the delay element 74 to select between the clock 72 and the delay element 74. The multiplexer 76 further has a select input 86 which determines whether the first clock signal 78 or the second clock signal 80 is selected.

The circuit 70 further includes a pseudo-random number generator 82 having an output 84 coupled to the select input 86. The multiplexer 76 has an output 88 and generates at the output 88 a jittered clock signal by switching between the first clock signal output by the clock 72 and the second clock signal output by the delay element 74, responsive to the pseudo-random number generator 82.

The pseudo-random number generator 82 has a clock input 90 and, in the illustrated embodiment, is clocked by the delayed clock output by the delay element 74 in order to avoid glitches. The pseudo-random number generator 82 provides at its output 84 a pseudo-random number for each clock cycle, and the value at the output 84 will select one of the two inputs 78 or 80 of the multiplexer to be present at the output 88 of the multiplexer. The output 88 of the multiplexer is used as the baseband circuit main clock. The pseudo-random number generator 82 further includes an NRST input 92. The circuit 70 further includes an AND logic gate 94 having an output 96 coupled to the NRST input 92 of the pseudo-random number generator 82 and having inputs 98 and 100.

The circuit 70 further includes a flip-flop 102. In the illustrated embodiment, the flip-flop 102 is a D-type flip-flop. The flip-flop 102 has a Qn output 104 coupled to the input 100 of the AND gate 94. The flip-flop 102 further has a clock input 106 coupled to the output of the delay element 74. The flip-flop 102 further includes an NRST input 108 and a D input 110. The D input 110 and NRST input 108 are used to switch between bypassing the jittered clock circuit and using the jittered clock. More particularly, when it is desired to bypass using the jittered clock, a value is latched by the flip-flop 102 to constantly reset the pseudo random number generator 82 is reset so that the selection made by the multiplexer 76 is fixed.

With this bypass circuitry, one can easily switch between jittered clock or non-jittered clock, without causing any glitch on the output clock. This is particularly interesting if the jittered clock is wanted only during certain phases of an application's operation.

Figure 8:
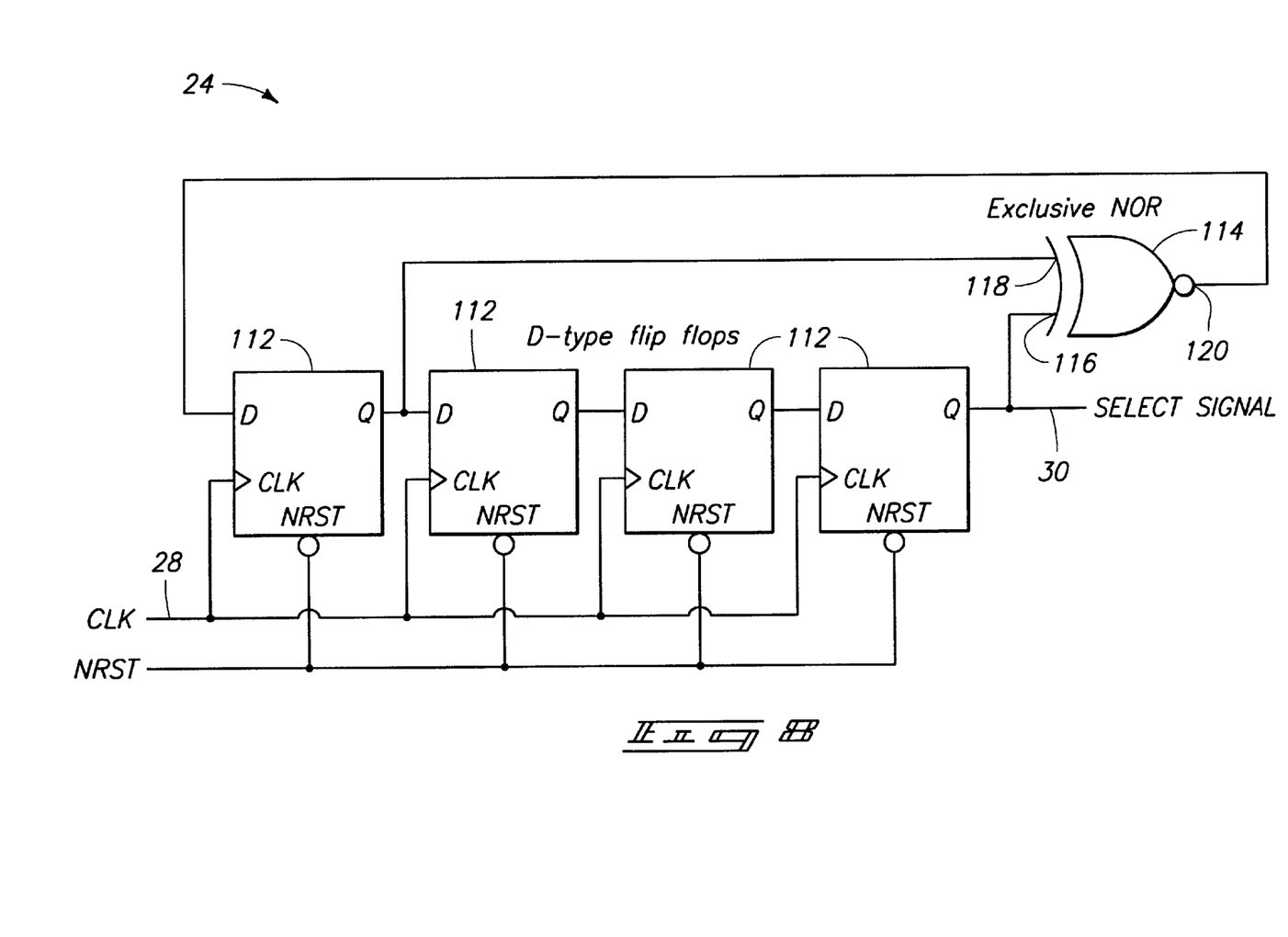
FIG. 8 is a circuit schematic of a pseudo-random number generator used in the clock jitter circuit of FIG. 1.
Figure 11:
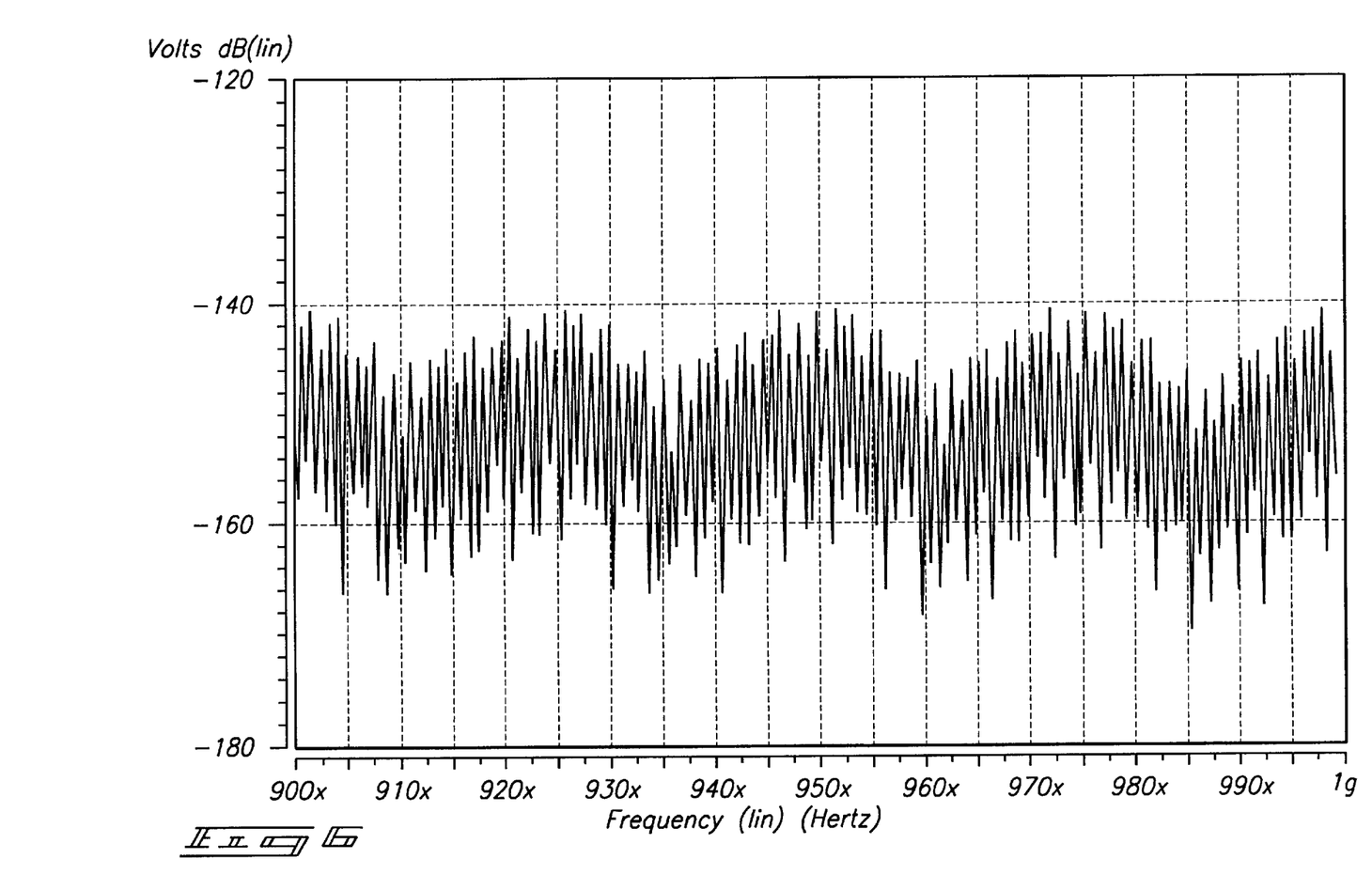

An example of one pseudo-random number generator circuitry that could be employed in the circuitry of FIG. 1 is shown in FIG. 8. This is just an example, other alternative embodiments are possible.

The pseudo-random number generator 24 shown in FIG. 8 includes four flip-flops chained together. In the illustrated embodiment, the flip-flops 112 are D-type flip-flops respectively having inputs D and outputs Q. The pseudo-random number generator 24 further includes a logic gate 114 having an input 116 coupled to the output of one of the flip-flops 112, having another input 118 coupled to the output of another one of the flip-flops 112, and having an output 120 coupled to the input of the first flip-flop 112 of the chain. In the illustrated embodiment, the logic gate 114 is an exclusive-NOR gate and the input 118 is coupled to the output of the first flip-flop, and the input 116 is coupled to the output of the last flip-flop. Other embodiments are possible.

The embodiment shown in FIG. 8 creates a pseudo-random series of fifteen steps, which are repeated, and is the one that was used for the simulations of which the results are shown in FIGS. 3–6. The pseudo-random number generator 24 can be modified, to increase randomness, by increasing the number of steps in the series. The circuitry of FIG. 8 can also be modified by making several pseudo-random generating chains that can control different selection channels in case a multiplexer with more than two inputs is used, as described above. The circuit shown in FIG. 8 is an example of what can be easily achieved with a very low area and power. The illustrated implementation only uses four flip-flops (D-type, in the illustrated embodiment), and one exclusive NOR.

Although preferred embodiments have been described, the invention has other applications. Any application that uses a clock signal and in which it is desired to reduce EMI emissions in frequencies higher than the clock frequency can benefit from the invention. More particularly, applications that can benefit from the invention are those in which the high frequencies are high enough for the delay added to the clock to be negligible versus the clock period (where period=1/frequency).

By adding a well controlled jitter, instead of any jitter, electromagnetic interference is reduced while still maintaining a working silicon.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of producing a clock signal with reduced electromagnetic interference spectral components, the method comprising:
   providing a first clock signal;
   producing a second clock signal by delaying the first clock signal; and
   generating a jittered clock signal by switching between the first clock signal and the second clock signal at times selected responsive to a random number generator; and
   producing multiple additional clock signals, different from the first and second clock signals, and wherein generating a jittered clock signal comprises generating a jittered clock signal by switching between the first clock signal, the second clock signal, and the additional clock signals, to select any one of the time signals, at times selected responsive to the random number generator; and
   providing a multiplexer having binary select inputs, wherein switching between the first clock signal, the second clock signal, and the additional clock signals is performed by the multiplexer, the random number generator being coupled to one of binary select inputs and an additional random number generator being coupled to another of the binary select inputs.

2. A method of producing a clock signal with reduced electromagnetic interference spectral components, the method comprising:
   providing a first clock signal;
   producing a second clock signal by delaying the first clock signal; and
   generating a jittered clock signal by switching between the first clock signal and the second clock signal at times selected responsive to a random number generator, wherein the random number generator comprises a plurality of flip-flops chained together, the flip-flops having inputs and outputs, and a logic gate coupled to the flip-flops to perform a logic function based on the outputs of two of the flip-flops and to provide the result of the logic function to the input of one of the flip-flops.

3. A method of producing a clock signal in accordance with claim 2 wherein the random number generator comprises a plurality of flip-flops chained together, the flip-flops having inputs and outputs, and a logic gate coupled to the flip-flops to perform a logic function based on the outputs of two of the flip-flops and to provide the result of the logic function to the first of the flip-flops.

4. A method of producing a clock signal in accordance with claim 2 wherein the random number generator comprises no more than four flip-flops chained together, the flip-flops having inputs and outputs, and no more than one logic gate coupled to the flip-flops to perform a logic function based on the outputs of two of the flip-flops and to provide the result of the logic function to the first of the flip-flops.

5. A method of producing a clock signal in accordance with claim 1 and further comprising producing a third clock signal, different from the first and second clock signals, by delaying one of the first and second clock signals, and wherein generating a jittered clock signal comprises generating a jittered clock signal by switching between the first clock signal, the second clock signal, and the third clock signal at times selected responsive to the random number generator.

6. A method of producing a clock signal in accordance with claim 1 wherein the first clock has a frequency above 10 MHz and wherein the second clock signal is produced by delaying the first clock signal by less than 2800 picoseconds.

7. A method of producing a clock signal in accordance with claim 1 wherein the first clock has a frequency between 6.5 and 19.5 MHz and wherein the second clock signal is produced by delaying the first clock signal by between 1 and 700 picoseconds.

8. A method of producing a clock signal in accordance with claim 1 wherein the first clock has a frequency between 12.5 and 13.5 MHz and wherein the second clock signal is produced by delaying the first clock signal by between 250 and 450 picoseconds.

9. A method of producing a clock signal that generates reduced electromagnetic interference, the method comprising:
   providing a first clock signal;
   producing a second clock signal by delaying the first clock signal;
   providing a multiplexer having inputs coupled to the first and second clock signals, wherein the multiplexer has multiple additional inputs and has a plurality of binary selection inputs, the method further comprising producing multiple additional clock signals, different from the first and second clock signals and different from each other, and coupling the multiple additional clock signals to respective additional inputs of the multiplexer, and wherein generating a jittered clock signal comprises generating a jittered clock signal by causing the multiplexer to switch between the first clock signal, the second clock signal, and the additional clock signals, to select any one of the time signals, at times selected responsive to a plurality of pseudo-random number generators, different pseudo-random number generators being coupled to different binary selection inputs; and
   generating a jittered clock signal using the multiplexer to pseudo-randomly switch between the first clock signal and the second clock signal and the additional clock signals over time.

10. A method of producing a clock signal in accordance with claim 9 wherein pseudo-randomly switching comprises coupling a pseudo-random number generator to the multiplexer, the pseudo-random number generator comprising a plurality of flip-flops chained together, the flip-flops having inputs and outputs, and a logic gate coupled to the flip-flops to perform a logic function based on the outputs of two of the flip-flops and to provide the result of the logic function to the input of one of the flip-flops.

11. A method of producing a clock signal in accordance with claim 9 wherein pseudo-randomly switching comprises coupling a pseudo-random number generator to the multiplexer, the pseudo-random number generator comprising a plurality of flip-flops chained together, the flip-flops having inputs and outputs, and a logic gate coupled to the flip-flops to perform a logic function based on the outputs of two of the flip-flops and to provide the result of the logic function to the first of the flip-flops.

12. A method of producing a clock signal in accordance with claim 9 wherein pseudo-randomly switching comprises coupling a pseudo-random number generator to the multiplexer, the pseudo-random number generator comprising no more than four flip-flops chained together, the flip-flops having inputs and outputs, and no more than one logic gate coupled to the flip-flops to perform a logic function based on the outputs of two of the flip-flops and to provide the result of the logic function to the first of the flip-flops.

13. A method of producing a clock signal in accordance with claim 9 wherein the first clock has a frequency above 10 MHz and wherein the second clock signal is produced by delaying the first clock signal by less than 2800 picoseconds.

14. A method of producing a clock signal in accordance with claim 9 wherein the first clock has a frequency between 6.5 and 19.5 MHz and wherein the second clock signal is produced by delaying the first clock signal by between 1 and 700 picoseconds.

15. A method of producing a clock signal in accordance with claim 9 wherein the first clock has a frequency between 12.5 and 13.5 MHz and wherein the second clock signal is produced by delaying the first clock signal by between 250 and 450 picoseconds.

16. A method of reducing electromagnetic interference in a GSM phone having a plurality of components that use a clock signal, the method comprising:
providing a first clock signal;
producing a second clock signal by delaying the first clock signal;
generating a jittered clock signal by switching between the first clock signal and the second clock signal at times determined responsive to a random number generator; wherein the random number generator comprises a plurality of flip-flops chained together, the flip-flops having inputs and outputs, and a logic gate coupled to the flip-flops to perform a logic function based on the outputs of two of the flip-flops and to provide the result of the logic function to the input of one of flip-flops;
using the jittered clock signal as a system clock for at least some components of the GSM phone, and
using the jittered clock signal as a system clock for at least some components of the GSM phone.

17. A method of reducing electromagnetic interference in a GSM phone in accordance with claim 16 wherein the random number generator comprises a plurality of flip-flops chained together, the flip-flops having inputs and outputs, and a logic gate coupled to the flip-flops to perform a logic function based on the outputs of two of the flip-flops and to provide the result of the logic function to the first of the flip-flops.

18. A method of reducing electromagnetic interference in a GSM phone in accordance with claim 16 wherein the random number generator comprises no more than four flip-flops chained together, the flip-flops having inputs and outputs, and no more than one logic gate coupled to the flip-flops to perform a logic function based on the outputs of two of the flip-flops and to provide the result of the logic function to the first of the flip-flops.

19. A method of reducing electromagnetic interference in a GSM phone in accordance with claim 16 and further comprising producing a third clock signal, different from the first and second clock signals, by delaying one of the first and second clock signals, and wherein generating a jittered clock signal comprises generating a jittered clock signal by switching between the first clock signal, the second clock signal, and the third clock signal at times selected responsive to the random number generator.

20. A method of reducing electromagnetic interference in a GSM phone in accordance with claim 16 and further comprising producing multiple additional clock signals, different from the first and second clock signals, and wherein generating a jittered clock signal comprises generating a jittered clock signal by switching between the first clock signal, the second clock signal, and the additional clock signals, to select any one of the time signals, at times selected responsive to the random number generator.

21. A method of reducing electromagnetic interference in a GSM phone in accordance with claim 16 wherein the first clock has a frequency above 10 MHz and wherein the second clock signal is produced by delaying the first clock signal by less than 2800 picoseconds.

22. A method of reducing electromagnetic interference in a GSM phone in accordance with claim 16 wherein the first clock has a frequency between 6.5 and 19.5 MHz and wherein the second clock signal is produced by delaying the first clock signal by between 1 and 700 picoseconds.

23. A method of reducing electromagnetic interference in a GSM phone in accordance with claim 16 wherein the first clock has a frequency between 12.5 and 13.5 MHz and wherein the second clock signal is produced by delaying the first clock signal by between 250 and 450 picoseconds.

24. A method of producing a clock signal that generates reduced electromagnetic interference, the method comprising:
providing a first clock signal;
producing a second clock signal by delaying the first clock signal;
producing multiple additional clock signals, different from the first and second clock signals and different from each other; and
generating a jittered clock signal using a multiplexer to pseudo-randomly switch between the first clock signal and the second clock signal and the additional clock signals over time, the multiplexer having inputs coupled to the respective clock signals and having a plurality of binary selection inputs, wherein generating a jittered clock signal comprises generating a jittered clock signal by causing the multiplexer to switch between the first clock signal, the second clock signal, and the additional clock signals, to select any one of the time signals, at times selected responsive to a plurality of pseudo-random number generators, different pseudo-random number generators being coupled to different binary selection inputs, the pseudo-random number generators respectively comprising no more than four flip-flops chained together, the flip-flops having inputs and outputs, and no more than one logic gate coupled to the flip-flops to perform a logic function based on the outputs of two of the flip-flops and to provide the result of the logic function to the first of the flip-flops.

* * * * *